Jan. 30, 1940.  J. S. LOCKE  2,188,775
ZONE TEMPERATURE CONTROL SYSTEM
Filed Jan. 2, 1936  2 Sheets-Sheet 1
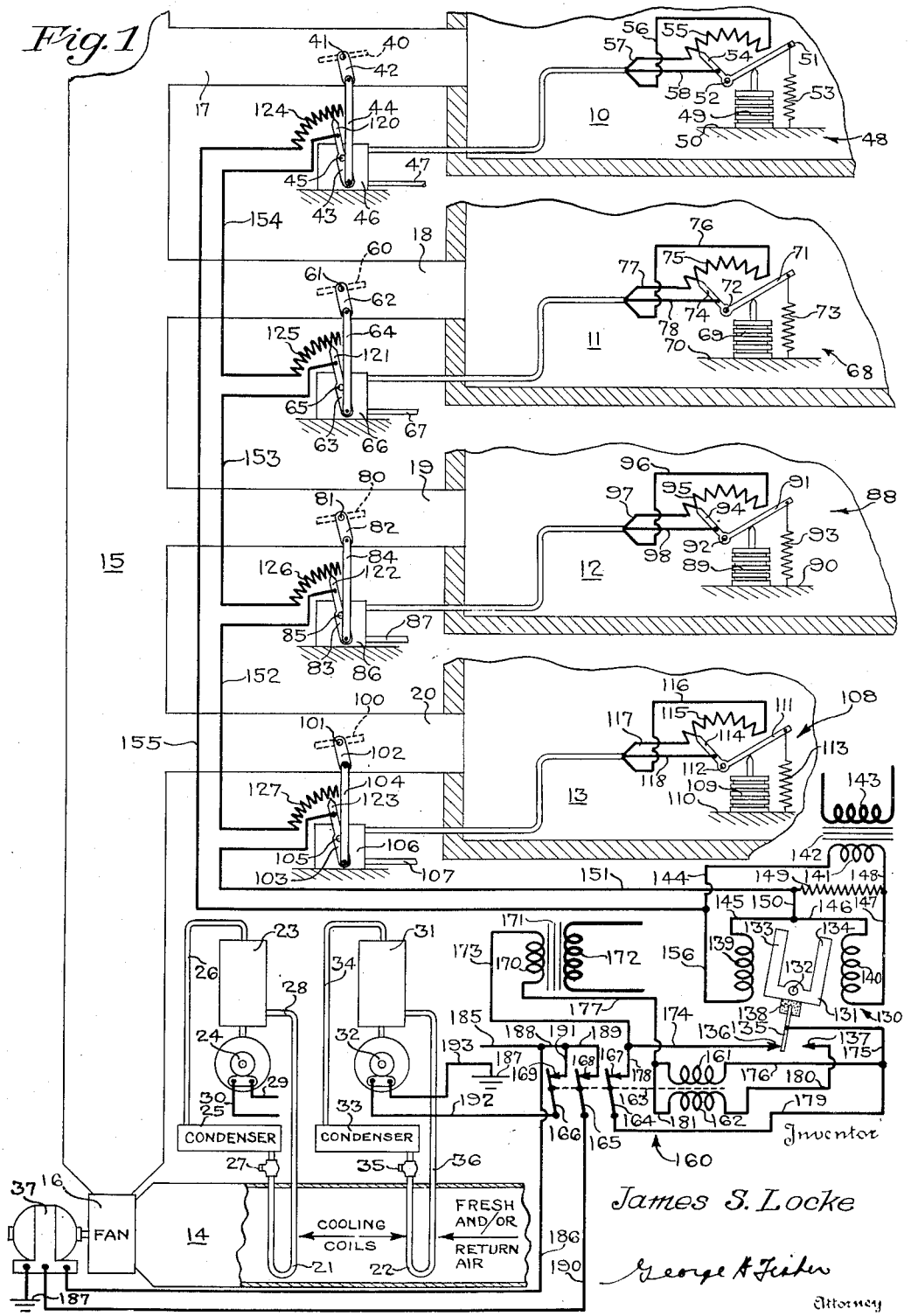
James S. Locke
George A. Fisher
Attorney Jan. 30, 1940.  J. S. LOCKE  2,188,775
ZONE TEMPERATURE CONTROL SYSTEM
Filed Jan. 2, 1936  2 Sheets-Sheet 2
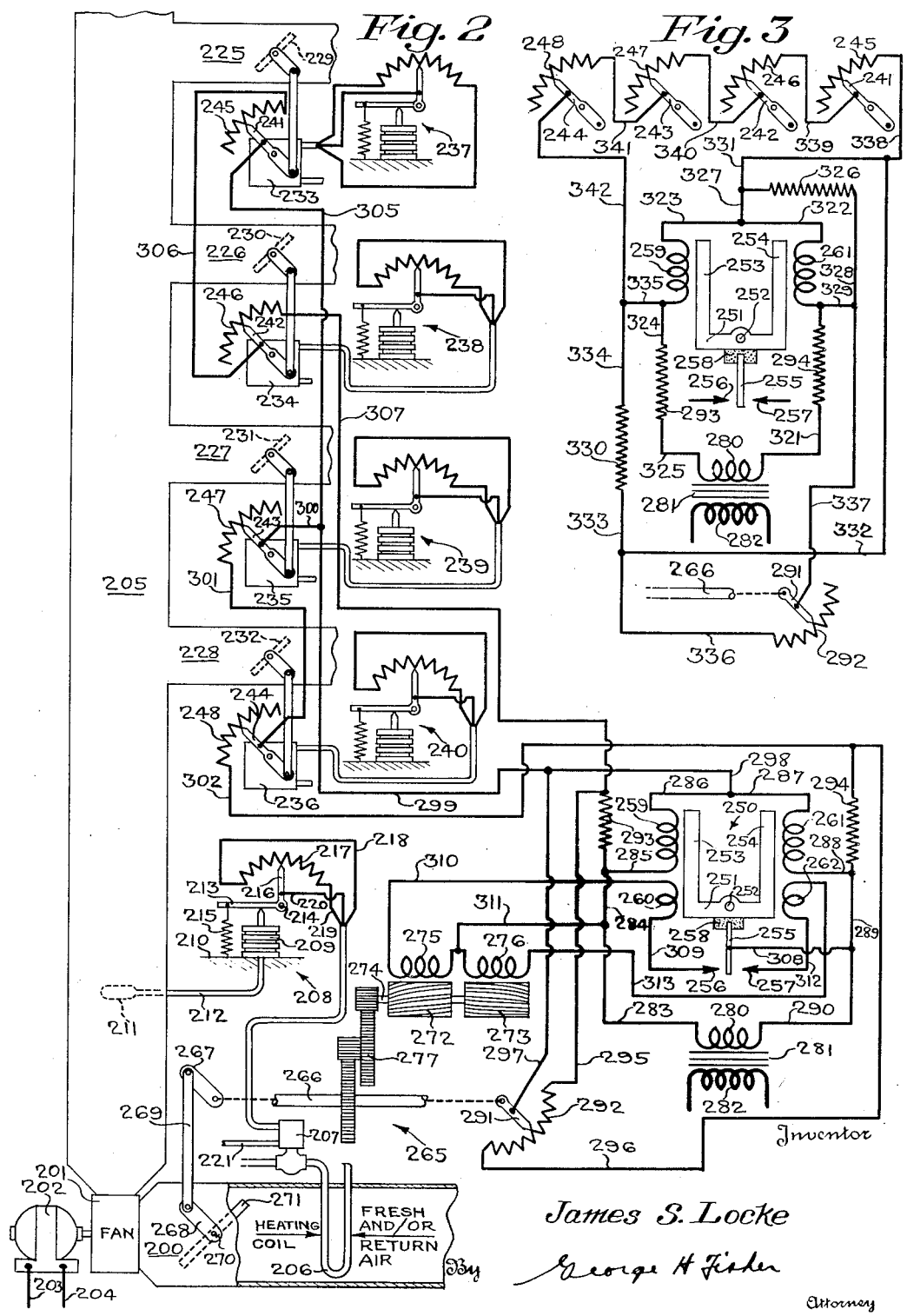
Inventor
James S. Locke
By George H Fisher
Attorney Patented Jan. 30, 1940

2,188,775

UNITED STATES PATENT OFFICE 2,188,775

ZONE TEMPERATURE CONTROL SYSTEM

James S. Locke, Minneapolis, Minn., assignor to Minneapolis-Honeywell Regulator Company, Minneapolis, Minn., a corporation of Delaware Application January 2, 1936, Serial No. 57,168

24 Claims. (Cl. 236—1)

In controlling the conditions within a plurality of spaces or rooms, it is common practice to provide a central condition changing means or a supply of condition changing fluid which is distributed to the various rooms or spaces or to individual air conditioning devices therein under the control of damper or valve means for each room or space, there being condition responsive means in such room or space to in turn control the associated damper or valve means. In the case where the fluid medium takes the form of air which is conditioned, as by being heated or cooled or by having the moisture content thereof changed, the branch ducts which deliver the air to the various rooms or spaces are designated so as to deliver quantities of air to each room or space which are proportional to the size of the space or the heat loss therefrom. If the damper controlling the flow of such conditioned air to one or more of the spaces is moved towards closed position or is completely closed, and if the same total volume of air is supplied, it will be evident that the volume of air supplied to the various spaces will be changed. In those in which the dampers have been closed or partially closed, the volume, of course, will be less but in the remaining rooms or spaces, the volume will increase. In addition, the velocity of the flow of air will increase through all of the branch ducts except for those which may be completely closed off by their associated dampers. Such an increase in the velocity of the air flowing to the various rooms or spaces causes several undesirable results. If the velocity of the flow of the air through the various branch ducts becomes too great, a whistling noise may ensue which is, of course, objectionable. In addition, since these various branch ducts are often of varying sizes in order to provide the proper amounts of conditioned air to the various spaces, the closing off of one of the ducts without any reduction in the total volume of air supplied will upset the balance in the air flows through the remaining ducts.

It has heretofore been proposed to overcome these difficulties by varying the total volume of air delivered to the rooms or spaces through the agency of a mechanism which responds to the pressure in the main delivery duct. In the instant invention, the volume of air supplied to all of the rooms is varied or changed, not by reason of the response of a pressure responsive member, but as a result of the actual movement of the various dampers in the several main ducts.

One of the objects of the present invention, therefore, is the provision of an air conditioning system of the zone type wherein the total quantity of air delivered to the various zones is varied in accordance with, or as the result of, movement of the dampers which control the individual flow of conditioned air to the different zones.

In one form of the invention, instead of attempting to vary the total quantity of air delivered to the various zones in exact accordance with the positions of the individual dampers therefor, the arrangement is such that the air delivery is varied only in a small number of steps. To be exact, the air delivery is maintained at its largest volume until the average position of all the individual zone dampers indicate that only half of the total delivery of air is necessary. When this occurs, the delivery of air is reduced by one half. It will be evident that a larger number of steps could be utilized if desired.

A further object of the invention, therefore, is the provision of a zone control system in which the volume of air delivered is varied in definite steps as the average position of all of the dampers indicates that such a proportionate reduction in the volume of air delivered should take place.

In another form of the invention, the delivery of air is varied exactly in accordance with the positions of the various dampers so as to give a graduated and variable volume of air delivery as the various dampers move back and forth in their respective branch ducts.

A further object of the invention is the provision of a zone control system in which the movements of the dampers in the various zones are utilized to proportion the total volume of air delivered in accordance with the settings of the various dampers.

Other objects of the invention include the various details by which these functions are accomplished and will be found in the claims, in the drawings, and in the descriptive material.

For a more complete understanding of the invention, reference may be had to the following detailed description and the accompanying drawings, in which:

Figure 1 is a diagrammatic showing of one form of the present invention wherein the volume of air delivered to the zones is varied in steps, Figure 2 is a modified showing of the invention wherein the volume of air supplied is varied exactly in accordance with the positions of the various zone dampers, and, Figure 3 is a diagrammatic showing of a modified control circuit arrangement which can be utilized in the system of Figure 2.

Referring first to Figure 1, a plurality of rooms or zones which it is desired to control are indicated at 10, 11, 12 and 13. Conditioned air for all of the rooms or zones is provided by an air conditioning device 14. Fresh air or return air or a mixture of fresh and return air, as is common in the art, is delivered to the air conditioning device 14 wherein it is conditioned, after which it is forced into a main distributing duct 15 by means of a fan 16. The rooms or zones 10, 11, 12 and 13 are individually connected to the main distributing duct 15 by means of branch ducts 17, 18, 19 and 20.

The air conditioning device 14 may be utilized to treat the air passing therethrough in any desired manner by any of the apparatus now well-known in the art. In fact, under certain conditions, the treating of the air delivered to the various rooms or zones might not be desired and the present invention has equal utility when the air being supplied to the various spaces is utilized only for the purposes of ventilation and the like. In the apparatus disclosed in Figure 1 of the drawings, the air passing through the air conditioning device 14 is only cooled without making any attempt to control the moisture content of the same. For this purpose, two cooling coils in the form of expansion coils 21 and 22, are located in the air conditioning device 14. A first compressor 23, that is driven by an electrical motor 24, supplies refrigerant to the first cooling coil 21. Associated with the compressor 23 is the usual condenser 25, which is connected thereto by means of a pipe 26. The condenser 25 is also connected to the cooling coil 21, through the usual expansion valve 27, and the other end of the cooling coil 21 is connected to the compressor 23 by a pipe 28. This compressor 23 normally operates continuously and power is supplied to the motor 24 thereof by means of line wires 29 and 30. Refrigerant is supplied to the second cooling coil 22 by means of a compressor 31 which is driven by an electric motor 32. This compressor 31 is connected to a condenser 33 by a pipe 34 and the condenser 33 is further connected to one end of the cooling coil 22 through an expansion valve 35. The other end of the second cooling coil 22 is connected to the compressor 31 by a pipe 36. The motor 32 for compressor 31 is controlled in a manner which will will be set forth in detail hereinafter. The fan 16 is driven by a two-speed fan motor 37 which is controlled in a manner to be explained hereinafter.

The branch duct 17 is provided with a damper 40 which is secured to a pivoted shaft 41. Also secured to the shaft 41 is a crank 42. This crank 42 is connected to a similar crank 43 by means of a connecting link 44. The crank 43 is connected to the main operating shaft 45 of a motor mechanism 46 to which power is supplied by suitable line wires 47. This motor mechanism 46 is controlled by a suitable thermostat which is located in or responds to the temperature of the room or space 10. This thermostat is generally indicated at 48 and includes a pressure responsive member in the form of a bellows 49. One end of this bellows 49 is fastened to a suitable support 50 and the other end thereof cooperates with the actuating arm 51 of a bell-crank which is pivoted at 52. The bellows 49 is charged with a volatile fluid so that it develops variable pressures therein upon changes in the temperature to which it is subjected and these variable pressures are opposed by a spring 53 which has one of its ends secured to the actuating arm 51 and its other end secured to the support 50. The bell-crank, which is pivoted at 52, also includes a control arm 54 which cooperates with a control resistance 55. The opposite ends of this control resistance 55 and the control arm 54 are connected to the motor mechanism 46 by means of wires 56, 57 and 58. The arrangement of this thermostat 48 is such that the control arm 54 traverses the control resistance 55 upon relatively small changes in temperature in the room or space 10. For example, the control arm 54 may engage the extreme left-hand end of resistance 55 when the temperature of the room or space rises to 76° F., and may engage the extreme right-hand end of this control resistance 55 when the temperature of the room or space 10 falls to 74° F. Such movement of the control arm 54 operates the motor mechanism 46 so as to move the damper 40 from its full open position to its full closed position. In other words, the damper 40 assumes positions between full open and full closed position which correspond exactly to the positions of the control arm 54 in respect to the control resistance 55.

The branch duct 18, which connects the main delivery duct 15 with the room or zone 11, is provided with a damper 60 which is secured to a pivoted shaft 61. A crank 62 is also secured to the pivoted shaft 61 and is connected to a similar crank 63 by means of a link 64. The crank 63 is in turn secured to the main operating shaft 65 of a motor mechanism 66 to which power is supplied by line wires 67. This motor mechanism 66 is controlled by a thermostat 68 which is located in or responds to the temperature of the space 11. This thermostat includes a bellows 69 which has one of its ends secured to a suitable support 70. The other end of bellows 69 positions the actuating arm 71 of a bell-crank which is pivoted at 72. A spring 73 has one of its ends secured to the actuating arm 71 and its other end secured to the support 70 and operates to oppose the variable pressures which are built up in the bellows 69 upon temperature changes by the volatile fluid with which the bellows is charged. The bell-crank, which is pivoted at 72, further includes a control arm 74 that cooperates with a control resistance 75. The opposite ends of this control resistance 75 and the control arm 74 are connected to the motor mechanism 66 by means of wires 76, 77 and 78. This thermostat 68 may likewise have a range of from 74° F. to 76° F. and operates to position the damper 60 in varying positions from full open position to full closed position as the temperature of the room or space 11 falls from 76° F. to 74° F.

In exactly the same manner, the duct 19 is provided with a damper 80 which is secured to a pivoted shaft 81. A crank 82 is also secured to this shaft 81 and is connected to a similar crank 83 by a link 84. The crank 83 is secured to the main operating shaft 85 of a motor mechanism 86 to which electrical power is transmitted by means of line wires 87. This motor mechanism 86 is controlled by a thermostat 88 which responds to the temperature of the room or zone 12. The thermostat includes a bellows 89 which has one of its ends secured to a support 90. The movable end of bellows 89 serves to position the actuating arm 91 of a bell-crank which is pivoted at 92. A spring 93 serves to oppose the variable pressures created in bellows 89 upon temperature changes by reason of the volatile fluid with which it is charged and this spring 93 has one of its ends secured to the actuating arm 91 and its other end secured to the support 90. This bellcrank further includes a control arm 94 which cooperates with a control resistance 95. The opposite ends of control resistance 95 and the control arm 94 are all connected to the motor mechanism 86 by wires 96, 97 and 98. This thermostat 88 also has a two degree range and may operate between 76° F. and 74° F., and controls the motor mechanism 86 in such manner that the associated damper 80 is moved from full open position to full closed position as the temperature in the room or space 12 falls from 76° F. to 74° F.

The branch duct 20 is provided with a damper 100 which is secured to a pivoted shaft 101. A crank 102, which is secured to the shaft 101, is connected to a similar crank 103 by means of a link 104. The crank 103 is secured to the main operating shaft 105 of a motor mechanism 106 which is supplied with electrical power by means of line wires 107. The motor mechanism 106 is controlled by a thermostat 108 which responds to the temperature of the room or space 13. This thermostat includes a bellows 109 which has one of its ends secured to a suitable support 110. The free end of bellows 109 positions the actuating arm 111 of a bell-crank pivoted at 112. This bellows 109 is charged with volatile fluid wherefore variable pressures are created in bellows 109 upon temperature variations and these variable pressures are opposed by a spring 113 which has one of its ends secured to the actuating arm 111 and its other end secured to the support 110. This bell-crank further includes a control arm 114 which cooperates with a control resistance 115. The opposite ends of control resistance 115 and the control arm 114 are connected to the motor mechanism 106 by means of wires 116, 117 and 118. This thermostat 108 may also have a two degree operating range and serves to move damper 100 from its full open position to its full closed position when the temperature of the room or space 13 falls from 76° F. to 74° F.

While each of the thermostats 48, 68, 88, and 108 has been indicated as having the same range and operating to maintain the same temperatures in the associated spaces 10, 11, 12 and 13, it is to be understood that these thermostats could have varying ranges and varying operating points so as to maintain different temperatures in these various spaces. Also, it is to be understood that the spaces 10, 11, 12 and 13 may require different volumes of conditioned air wherefore the branch ducts 17, 18, 19 and 20 may be of different sizes and proportioned to the volumes of air required by the rooms or spaces to which they are connected.

It is now thought to be well understood in the art how potentiometer thermostats of the type indicated at 48, 68, 88 and 108 operate to graduatingly position a motor means such as those indicated at 46, 66, 86 and 106. These motor means may be of the electrical balanced type as will be more apparent from the descriptive material following hereinafter or they may be of the mechanical follow-up type such as disclosed in Lewis L. Cunningham Patent No. 1,989,972 which issued on February 5, 1935.

In order that the positions of the dampers 40, 60, 80 and 100 may be utilized to control the total volume of air supplied to the main distributing ducts 15, a control arm is secured to each of the main operating shafts of the motor mechanisms 46, 66, 86 and 106. These control arms are indicated at 120, 121, 122 and 123 and are shown as extensions of the cranks 43, 63, 83 and 103. Since these control arms are connected to the main operating shafts of the motor mechanisms and since these main operating shafts are in turn mechanically connected to these dampers, it will be evident that the control arms will be positioned exactly in accordance with the positions of the dampers. These control arms respectively cooperate with control resistances 124, 125, 126 and 127.

These control arms and associated control resistances control the operation of a balanced relay which is generally indicated at 130. This balanced relay includes an armature 131, which is pivoted at 132, and which includes legs 133 and 134. This armature 131 controls a switch arm 135 that in turn cooperates with a pair of contacts 136 and 137. The switch arm 135 is secured to the armature 131 through a piece of insulating material indicated at 138. A relay winding 139 cooperates with the leg 133 and a similar relay winding 140 cooperates with the leg 134. It will be evident from the arrangement shown that if the relay coil 139 is energized more highly than the relay coil 140, then the switch arm 135 will move into engagement with the contact 136. On the other hand, if the relay coil 140 is energized more highly than the relay coil 139, the switch arm 135 will engage the contact 137. When these relay coils are substantially equally energized, the switch arm 135 will assume a position between contacts 136 and 137 and will not engage either of them.

The relay coils 139 and 140 are connected in series across the secondary 141 of a step-down transformer 142 having a high voltage primary 143. This series circuit is as follows: secondary 141, wire 144, wire 156, relay coil 139, wire 145, wire 146, relay coil 140, wire 147 and wire 148 to the other side of secondary 141. A fixed resistance 149 is connected in parallel with the relay coil 140, this circuit being as follows: from the upper end of relay coil 140, wire 146, wire 150, resistance 149, and wire 147 to the bottom of relay coil 140. All of the control resistances 124, 125, 126 and 127, in series, are connected in parallel with the relay coil 139. This circuit is as follows: from the upper end of relay coil 139, wire 145, wire 150, wire 151, control arm 123, resistance 127, wire 152, control arm 122, resistance 126, wire 153, control arm 121, resistance 125, wire 154, control arm 120, resistance 124, wire 155 and wire 156 to the lower end of relay coil 139. As will be evident from an inspection of Figure 1, each control arm and associated resistance is so arranged that the amount of resistance placed in this circuit is increased as the associated damper moves from full closed position toward full open position. In other words, with all of the dampers completely open, all of each of the resistances 124, 125, 126 and 127 is in the circuit set out above. As each of these dampers moves towards closed position, less and less of each of these resistances is in such circuit.

The balanced relay 130 acts in the nature of a pilot relay to control a second relay generally indicated at 160. This relay 160 includes a pair of coils 161 and 162 which cooperate in the positioning of a single armature 163. The coil 161 is an energizing or operating coil whereas the coil 162 is a bucking or neutralizing coil. The armature 163 controls switch arms 164, 165, and 166 which respectively cooperate with contacts 167, 168 and 169. Power is supplied to these two coils 161 and 162 by the low voltage secondary 170 of a step-down transformer 171 having a high voltage primary 172. Whenever switch arm 135 moves into engagement with contact 136, an energizing circuit is established for the operating coil 161 as follows: secondary 170, wire 173, wire 174, contact 136, switch arm 135, wire 175, wire 176, operating coil 161; and wire 177 to the other side of secondary 170. Energization of this operating coil 161 attracts armature 163 and moves it to the position shown in Figure 1 wherein the switch arms 164, 165 and 166 engage their respective contacts 167, 168 and 169. Engagement of switch arm 164 with contact 167 establishes a holding circuit for the operating coil 161 which is entirely independent of the switch arm 135 and contact 136. This holding circuit is as follows: secondary 170, wire 173, wire 178, contact 167, switch arm 164, wire 179, wire 175, operating coil 161 and wire 177 to the other side of secondary 170. The operating coil 161 therefore remains energized after switch arm 135 separates from contact 136. Upon subsequent movement of switch arm 135 into engagement with contact 137, an energizing circuit for the bucking coil 162 is established as follows, provided the switch arm 164 is engaging contact 167: secondary 170, wire 173, wire 178, contact 167, switch arm 164, wire 179, wire 175, switch arm 135, contact 137, wire 180, bucking coil 162, wire 181, and wire 177 to the other side of secondary 170. Energization of the bucking coil 162 causes a magnetic flux to be set up which is equal and opposite to that set up by the energization of operating coil 161. The armature 163 and the associated switch arms therefore move to the left under the action of gravity wherefore the switch arms 164, 165 and 166 disengage the respective contacts 167, 168 and 169. Disengagement of switch arm 164 from contact 167 not only interrupts the energizing circuit for the bucking coil 162 but also interrupts the holding circuit for the operating coil 161.

Therefore, as explained above, armature 163 will be moved to the position shown whenever switch arm 135 engages contact 136. It will then remain in this position even after switch arm 135 disengages contact 136 and until such time as switch arm 135 engages contact 137.

The fan 37 is constantly energized at half speed by a circuit as follows: line wire 185, wire 186, fan motor 37, and ground 187. Engagement of switch arm 165 with contact 168 sets up a full speed circuit for fan motor 37 as follows: line wire 185, wire 188, wire 189, contact 168, switch arm 165, wire 190, fan motor 37, and ground 187. The switch arm 166 and contact 169 control an energizing circuit for compressor motor 32 as follows: line wire 185, wire 188, wire 191, contact 169, switch arm 166, wire 192, compressor motor 32, and wire 193 to ground 187.

*Operation of the system of Figure 1*

With the parts in the position shown, the temperature of each room 10, 11, 12 and 13 is substantially at the maximum permissible limit wherefore each of the dampers 40, 60, 80 and 100 is practically full open. As a result, the largest portions of each of the resistances 124, 125 126 and 127 are all connected in series with each other and these series-connected resistances are all in parallel with the relay coil 139, as pointed out above. The sum of all of these resistances is substantially twice that of the value of the fixed resistance 149. Therefore, there is more resistance in parallel with the relay coil 139 than there is in parallel with the relay coil 140. More current will therefore flow through the relay coil 139 than flows through the relay coil 140 wherefore the armature 131 has moved to the position shown in which switch arm 135 is engaging contact 136. Armature 163 of the relay 160 has therefore been moved to the position shown. Compressor motor 32 is therefore energized and the fan motor 37 is operating at full speed. Keeping in mind that the compressor motor 24 is constantly energized, both compressors 23 and 31 are now operating to furnish liquid refrigerant to the expansion or cooling coils 21 and 22 wherefore the air conditioning device 14 is operating at its full capacity to cool the air passing therethrough. Also, the largest possible volume of air is being caused to move through the air conditioning device 14 and to the distributing duct 15. Each room 10, 11, 12 and 13 will receive a proportion of this air which is dependent both upon the size of its particular branch duct and upon the setting of its particular damper. Now, as the temperature of any one of these rooms or of any number of these rooms drops, its respective damper will move towards closed position and similarly its control arm will cut out a corresponding portion of its associated control resistance. When the sum total of these series connected control resistances has thus been made substantially equal to the fixed resistance 149, then the two relay coils 139 and 140 will become substantially equally energized and the switch arm 135 will move intermediate the contacts 136 and 137. Any further drop in the temperature in any of these rooms will cause the sum total of these series connected resistances to be less than fixed resistance 149 whereupon the relay coil 140 will become more highly energized than the relay coil 139. Switch arm 135 will then move into engagement with contact 137 to energize the bucking coil 162 as described hereinabove. This causes movement of armature 163 to the left and separation of switch arms 164, 165 and 166 from the contacts 167, 168 and 169, all as previously explained. The compressor motor 32 is therefore deenergized and fan motor 37 is operated at half speed. Only half of the full quantity of air is now being delivered to the main distributing duct 15 and only the one cooling coil 21 is operating. In this manner, whenever the demand for cooled air, as determined by the average demand of all of the rooms, reaches one half or slightly less than one half of the full demand, then the fan speed is reduced to one half its maximum speed and the cooling effect in the air conditioning device 14 is also reduced to one half of its maximum effect.

It will be apparent that this condition may arise by reason of innumerable positions of the various dampers 40, 60, 80 and 100. For instance, if two of these dampers are substantially full opened and two of them are full closed, assuming all of the resistances 124, 125, 126 and 127 are equal, then this condition will exist. On the other hand, if three of the dampers are far enough closed, then this condition will exist even though the fourth damper be completely open. Stated in another way, whenever these dampers reach such a position that slightly less than half of the sum of the resistances 124, 125, 126 and 127 is connected into the parallel circuit for relay coil 139, then the fan speed will be reduced to one half and the effect of the cooling apparatus will likewise be reduced to one half its maximum. It will be apparent that if some of these rooms require more cool air than the others because of differing heat losses, then, as above pointed out, larger branch ducts will be used for such rooms. Also, the value of the resistance associated with such branch ducts will also be larger. It will also be apparent that instead of having this single step a number of steps could be utilized by providing the relay 130 with suitable switching mechanism.

Referring now to Figure 2 of the drawings, a somewhat similar system is disclosed but in this system the volume of air flow is controlled by a damper instead of by varying the fan speed and, in addition, the volume of air flow is varied graduatingly instead of in a single large step. Furthermore, the system of Figure 2 is shown as applied to a heating system instead of a cooling system.

In Figure 2 the air conditioning device is indicated at 200 and this device is connected to a fan 201 which is driven by a fan motor 202. The fan motor 202 is constantly energized by line wires 203 and 204. The fan serves to draw air through the air conditioning device 200 and delivers the same to a main distributing duct 205. This air which is drawn through the air conditioning device 200 again may be fresh air or it may be return air or it may be a combination or a mixture of fresh and return air. As in the case of the apparatus of Figure 1, the air thus delivered to the air conditioning device 200 may be controlled in any of the usual and well-known manners. For the purpose of heating this air, a heating coil 206 is disposed within the air conditioning device 200. The flow of heating fluid to this coil 206 is controlled by a modulating motorized valve 207 which is controlled by a thermostat generally indicated at 208. This thermostat 208 is of the remote bulb type of potentiometer thermostat and includes a bellows 209 which has one of its ends secured to a support 210. This bellows 209 is connected to a control bulb 211 through the medium of a connecting tube 212. The bellows 209 positions the actuating arm 213 of a bell-crank pivoted at 214. The bellows, control bulb and interconnecting tube are charged with a suitable volatile fluid so that variable pressures are created in the bellows 209 in accordance with the temperatures to which the control bulb 211 is subjected. These variable pressures are opposed by a spring 215 which has one of its ends secured to the actuating arm 213 and its other end secured to the support 210. This bell-crank further includes a control arm 216 which cooperates with a control resistance 217. The opposite ends of this control resistance 217 and the control arm 216 are connected to the motorized valve 207 by means of wires 218, 219 and 220. Power is supplied to this valve mechanism by line wires 221. The thermostat 208 may respond to any desired temperature and is herein shown as having its controlling bulb 211 disposed within the main delivery duct 205. As a result, this thermostat 208 controls the motorized valve 207 in such manner as to maintain the temperature of the air delivered from the air conditioning device 200 constant or within relatively narrow limits determined by the range of the thermostat 208. As in the case of the apparatus of Figure 1, the exact manner in which the heating of the air passing through the air conditioning device 200 is controlled is not material insofar as the broader phases of the present invention are concerned.

The main distributing duct 205 communicates with a plurality of rooms (not shown) through the medium of branch ducts 225, 226, 227 and 228. These branch ducts are respectively provided with dampers 229, 230, 231 and 232 and these dampers are in turn controlled by motor mechanisms 233, 234, 235 and 236. Each of these motor mechanisms is controlled by a thermostat which responds to the temperature of the particular room, the damper of which the motor mechanism controls. These thermostats are indicated at 237, 238, 239 and 240. These thermostats may, for example, have a 2° range so that they operate from 68° F. to 70° F. It will be noted that these thermostats are shown reversed as compared with the thermostats in the system of Figure 1. In other words, each of these thermostats upon temperature rise moves its control arm towards the right, whereas in the system of Figure 1, each of the thermostats in the various rooms moves its control arm to the left upon temperature rise. These thermostats all operate to gradually move their associated dampers from full open position to full closed position as the temperatures to which each thermostat is subjected rises from 68° F. to 70° F. In view of the explanation set forth in connection with the system of Figure 1, it is thought that the operation of these thermostats and associated dampers should be entirely clear.

As in the case of the system of Figure 1, each of the motor mechanisms is provided with a control arm that cooperates with an associated control resistance. These control arms are indicated at 241, 242, 243 and 244 and the cooperating resistances are indicated at 245, 246, 247 and 248.

These control arms and control resistances cooperate in the control of a balanced relay indicated generally at 250. This balanced relay includes an armature 251 which is pivoted at 252, this armature being provided with legs 253 and 254. The armature 251 positions a switch arm 255 that cooperates with a pair of spaced contacts 256 and 257. The switch arm 255 is connected to the armature 251 through the medium of a piece of insulating material 258. Associated with the leg 253 is a main relay winding 259 and an auxiliary winding 260. Similarly, a main relay winding 261 and an auxiliary winding 262 are associated with the leg 254 of the armature 251.

This balanced relay 250 controls the operation of a motorized mechanism indicated generally at 265. This motorized mechanism 265 includes a main operating shaft 266 to which a crank 267 is secured. This crank 267 is in turn connected to a similar crank 268 by means of a link 269. Crank 268 is secured to a pivoted shaft 270 which carries a damper 271 that is located in the air conditioning device 200 and is operable to determine the flow of air therethrough and into the main distributing duct 205. The main operating shaft 266 is adapted to be driven in reverse directions by a reversible motor means that is herein shown as comprising a pair of motor rotors 272 and 273 which are secured to a common rotor shaft 274. A field winding 275 is associated with the rotor 272 and a similar field winding 276 is associated with the rotor 273. The rotor shaft 274 is connected to the main operating shaft 266 through a torque amplifying and speed reducing gear train indicated at 277.

The main relay windings 259 and 261 of the balanced relay mechanism 250 are connected in series across the low voltage secondary 280 of a step-down transformer 281 having a high voltage primary 282. This circuit is as follows: secondary 280, wire 283, wire 284, wire 285, main relay winding 259, wire 286, wire 287, main relay winding 261, wire 288, wire 289 and wire 290 to the other side of secondary 280. The respective energizations of these two main relay windings 259 and 261 are adapted to be maintained substantially equal at all times by means of a balancing potentiometer which is operated by the main operating shaft 266. This balancing potentiometer includes a balancing control arm 291, which is driven by the main operating shaft 266, and a cooperating balancing resistance 292. The balancing resistance 292 is connected in parallel with the series connected main relay windings 259 and 261 through a pair of protective resistances 293 and 294, by a circuit as follows: from the lower end of main relay winding 259, wire 285, protective resistance 293, wire 295, balancing resistance 292, wire 296, protective resistance 294 and wire 288. The balancing control arm 291 is connected intermediate the two main relay windings 259 and 261 by being connected to the junction of wires 286 and 287 by wires 297 and 298. The respective energizations of these two main relay windings 259 and 261 are adapted to be unbalanced by the various control resistances which are operated by the motor mechanisms 233, 234, 235 and 236 which position the zone dampers 229, 230, 231 and 232. For this purpose, the resistances 248 and 247, in series, as well as the protective resistance 294, are connected in shunt with the main relay winding 261. This circuit is as follows: from the upper end of main relay winding 261, wire 287, wire 298, wire 299, wire 300, control arm 243, resistance 247, wire 301, control arm 244, resistance 248, wire 302, protective resistance 294, and wire 288 to the lower end of main relay winding 261. These two resistances 247 and 248 and their associated control arms 243, and 244 are so arranged that all of each of these resistances is included in this circuit when the associated dampers 231 and 232 are in their full open positions. As these two dampers move towards closed position, less and less of the resistances 247 and 248 are included in this circuit, and when these two dampers are both fully closed, none of either of these resistances is included in this circuit.

In a similar manner, the two resistances 245 and 246, as well as the protective resistance 293, are connected in shunt with the main relay winding 259 by a circuit as follows: from the upper end of relay winding 259, wire 286, wire 298, wire 299, wire 305, control arm 241, control resistance 245, wire 306, control arm 242, control resistance 246, wire 307, protective resistance 293 and wire 285 to the lower end of relay winding 259. These two control resistances 245 and 246 are arranged in respect to their respective control arms 241 and 242 in such manner that all of each of these resistances is contained in this shunt circuit when the respective dampers 229 and 230 are completely closed. As each of these dampers moves towards open position, part of each of these resistances 245 and 246 is cut out of this shunt circuit and when these two dampers 229 and 230 have been completely opened, none of either of these resistances 245 and 246 is contained in this shunt circuit.

The switch arm 255 is connected to the right-hand end of secondary 280 by a wire 290 and a wire 308. The contact 256, the auxiliary winding 260 and the field winding 275 are connected in series and to the left-hand end of secondary 280 as follows: contact 256, wire 309, auxiliary winding 260, wire 310, field winding 275, wire 311 and wire 283 to the left-hand side of secondary 280. In a similar manner, contact 257, auxiliary winding 262 and field winding 276 are all connected in series and to the left-hand end of secondary 280 by a circuit as follows: contact 257, wire 312, auxiliary winding 262, wire 313, field winding 276, wire 311 and wire 283 to the left-hand end of secondary 280.

*Operation of the system of Figure 2*

With the parts in the position shown, the temperature of each of the rooms to which the thermostats 237, 238, 239 and 240 respond is such that each of these thermostats is intermediate its range of movement so that its control arm is engaging the center of its control resistance. The dampers 229, 230, 231 and 232 are therefore all in intermediate positions between full open and full closed positions. It therefore follows that each of the control arms 241, 242, 243 and 244 is engaging the center of its associated control resistance 245, 246, 247 or 248. One half of each of the resistances 247 and 248 is therefore contained in the shunt circuit for main relay winding 261. Likewise, one-half of each of the resistances 245 and 246 is contained in the shunt circuit for main relay winding 259. Assuming that each of these resistances 245, 246, 247 and 248 is equal and that the two protective resistances 293 and 294 are equal, it will be apparent that the resistances in both the shunt circuits for the main relay windings 259 and 261 are equal. These main relay windings 259 and 261 are therefore equally energized and the armature 251 is in the intermediate position shown wherein switch arm 255 is disposed between contacts 256 and 257 and is not engaging either of them. This balanced condition of the energizations of these two relay coils results since the balancing contact arm 291 is likewise engaging the center of balancing resistance 292. The main operating shaft 266 is therefore in some predetermined position, such as half way between its extreme positions and the damper 271 is half open. Under these conditions, half of the maximum flow of air is passing through the air conditioning device 200 and to the distributing duct 205 and equal portions of this air are being delivered through each of the branch ducts 225, 226, 227 and 228. These air deliveries should just maintain the temperature in each of the rooms at the desired intermediate value.

If the temperature of the room or rooms being supplied by the branch duct 225 should rise, then the temperature at thermostat 237 becomes higher and its control arm moves along its associated control resistance towards its right-hand end. This causes an operation of motor means 233 to partially close the damper 229 so as to deliver less of the heated air to such room or space. This movement of the motor means 233 causes movement of the control arm 241 along control resistance 245 towards its left-hand end whereby more of resistance 245 is placed in the shunt circuit for main relay winding 259. More current therefore flows through main relay winding 259 and the upward pull on leg 253 of armature 251 is increased. Switch arm 255 therefore moves towards contact 256. If this rise in temperature be large enough, the switch arm 255 will engage contact 256 whereby field winding 275 and the auxiliary winding 260, in series, are energized as follows: secondary 280, wire 290, wire 308, switch arm 255, contact 256, wire 309, auxiliary winding 260, wire 310, field winding 275, wire 311 and wire 283 to the other side of secondary 280. The energization of auxiliary winding 260 causes an additional attractive force to be applied to leg 253 of armature 251 whereby the switch arm 255 is held firmly in engagement with the contact 256. Energization of field winding 275 causes rotation of main operating shaft 266 in such direction as to move damper 271 towards its full closed position. Such movement of main operating shaft 266 also moves balancing contact arm 291 upwardly along balancing resistance 292 towards its right-hand end. This movement of balancing contact arm 291 increases that portion of balancing resistance 292 which is connected in parallel with the main relay winding 261 so that the current flow through this main relay winding increases. When the main operating shaft has thus moved sufficiently far, the energization of main relay winding 261 in respect to the energization of main relay winding 259 will be such as to move switch arm 255 from engagement with the contact 256. The series circuit through the auxiliary winding 260 and the field winding 275 is thereupon interrupted. Deenergization of the auxiliary winding 260 removes the additional attractive force on leg 253 of the armature 251 so that the switch arm 255 moves further away from contact 256. This causes a substantial separation of this switch arm and contact thereby insuring a good break between these parts. Further rotation of main operating shaft 266 of course ceases upon deenergization of field winding 275.

The new position of damper 271 permits a smaller flow of air through the air conditioning device 200 and to the main distributing duct 205. This smaller flow of air results in less air passing through the branch duct 225 since its damper 229 has now been moved to a more nearly closed position by reason of the rise in temperature of the associated room or space. In this manner, any rise in temperature in the room or space associated with the branch duct 225 causes the damper 229 to partially close and likewise causes a corresponding closing of main damper 271.

A rise in temperature of the room supplied by the branch duct 226 would operate on the mechanism in exactly the same manner. On the other hand, a rise in temperature in either of the rooms supplied by branch ducts 227 or 228, while operating to close their associated dampers 221 and 232, operates to decrease the amounts of resistances 247 and 248 in the shunt circuit for main relay winding 261. This has the same effect as the prior increasing resistance in the shunt circuit for relay winding 259 so that once again, the main operating shaft 266 would be moved in a direction to move the main damper 271 more nearly closed.

On the other hand, a fall in temperature in either of the rooms supplied by the branch ducts 225 and 226 causes a corresponding opening movement of the associated dampers 229 and 230. Such movement of either of these dampers decreases the portion of resistance 245 or the portion of resistance 246 contained in the shunt circuit for main relay winding 259. A fall in the temperature of either of the rooms supplied by the branch ducts 227 and 228 also causes opening movement of dampers 231 and 232. Such opening movements, however, are accompanied by an increase in the amount of resistances 247 and 248 contained in the shunt circuit for main relay winding 261. In either event, the net result is the same in that the current flow through main relay winding 261 is increased in respect to the current flow in main relay winding 259. When this unbalance in the energizations of these main relay windings is sufficiently large, switch arm 255 moves into engagement with contact 257. A series circuit for the auxiliary winding 262 and the field winding 276 is thereupon established as follows: secondary 280, wire 290, wire 308, switch arm 255, contact 257, wire 312, auxiliary winding 262, wire 313, field winding 276, wire 311, and wire 283 to the other side of secondary 280. Energization of the auxiliary winding 262 increases the upward pull on leg 254 of armature 251 whereby switch arm 255 is held firmly in engagement with contact 257. Energization of field winding 276 causes rotation of main operating shaft 266 in a direction opposite to that previously set out so that main damper 271 moves towards open position. Such movement of main operating shaft 266 also moves balancing contact arm 291 downwardly along balancing resistance 292. This action serves to rebalance the energizations of main relay windings 259 and 261 so as to separate switch arm 255 from contact 257 when the main operating shaft 266 has moved sufficiently far. Separation of switch arm 255 and contact 257 interrupts the series circuit through auxiliary winding 262 and field winding 276. Deenergization of auxiliary winding 262 removes the extra pull on leg 254 of armature 251 wherefore switch arm 255 separates from contact 257 more widely. Further rotation of main operating shaft 266 ceases of course upon deenergization of field winding 276. The main damper 271 has now been moved towards open position by reason of a similar movement of one or more of the dampers 229, 230, 231 and 232.

In the manner explained above, it will now be obvious that movement of any of the dampers 229, 230, 231 and 232 towards open position causes an opening movement of main damper 271 to increase the total volume of air delivered to all of these rooms or spaces whereas a closing movement of any one or more of these dampers 229, 230, 231 or 232 causes a closing movement of main damper 271 to decrease the total volume of air delivered. As in the case of the system of Figure 1, if the various rooms supplied by the branch ducts 225, 226, 227 and 228 are of different sizes or have different heat losses, then these branch ducts will be proportioned accordingly. The thermostat 208, as previously explained, operates to maintain a constant delivered air temperature although it will be understood that any other desired type of temperature control or additional controls can be utilized, the present invention relating primarily to the distribution of conditioned air regardless of whether it be heating cooling, humidifying or dehumidifying, or any combination of these and regardless of the specific manner in which these conditions of the air are controlled.

Turning now to Figure 3 of the drawings, a slightly modified manner of controlling the respective energizations of the main relay windings 259 and 261 of the balancing relay mechanism 250 is shown. In this modification, the main relay windings 259 and 261 and the protective resistances 293 and 294, all in series, are connected across the secondary 280 of transformer 281 as follows: from the right-hand side of secondary 280, wire 321, protective resistance 294, main relay winding 261, wire 322, wire 323, main relay winding 259, wire 324, protective resistance 293, and wire 325 to the other side of secondary 280. A fixed resistance 326 is connected in shunt with the main relay winding 261 as follows: from the upper end of main relay winding 261, wire 322, wire 327, fixed resistance 326, wire 328, and wire 329 to the lower end of main relay winding 261. Similarly, a fixed resistance 330 is connected in parallel with the main relay winding 259 as follows: from the upper end of main relay winding 259, wire 323, wire 327, wire 331, wire 332, wire 333, fixed resistance 330, wire 334, and wire 335 to the lower end of main relay winding 259. In addition, the balancing resistance 292 is utilized as a rheostat rather than as a potentiometer and the effective portion of this balancing resistance 292 is connected in shunt with the main relay winding 261 as follows: from the upper end of main relay winding 261, wire 322, wire 327, wire 331, wire 332, wire 336, balancing resistance 292, balancing contact arm 291, wire 337, and wire 329 to the lower end of main relay winding 261. The control resistances 245, 246, 247 and 248, all in series, are connected in shunt with the main relay winding 259 as follows: from the upper end of main relay winding 259, wire 323, wire 327, wire 331, wire 338, resistance 245, control arm 241, wire 339, resistance 246, control arm 242, wire 340, resistance 247, control arm 243, wire 341 resistance 248, control arm 244, wire 342, and wire 335 to the lower end of main relay winding 259.

The parts are shown in positions corresponding to those in Figure 2 wherein each of control arms 241, 242, 243 and 244 is engaging the center of its associated control resistance 245, 246, 247 and 248. Also, the balancing contact arm 291 is engaging the center of balancing resistance 292. This means that all of the branch duct dampers 229, 230, 231 and 232 are half open and that the main damper 271 is also half open. The resistance of the balancing resistance 292 is such in respect to the total resistances of the control resistances 245, 246, 247 and 248 that with the parts as shown in Figure 3, the energizations of main relay windings 259 and 261 are substantially equal, wherefore the switch arm 255 is intermediate contacts 256 and 257 and is not engaging either of them.

If the temperature in any of the rooms supplied by the branch ducts 225, 226, 227 and 228 should rise, one of the control arms 241, 242, 243 or 244 will increase the effective part of its associated resistance whereupon the main relay winding 259 will become more highly energized than the main relay winding 261 and the contact 255 will thereupon move into engagement with contact 256. As explained in connection with Figure 2, this results in movement of main operating shaft 266 in such a direction that main damper 271 moves towards closed position. Such movement of main operatinng shaft 266 also caused upward or counter-clockwise movement of balancing contact arm 291 wherefore more of the balancing resistance 292 is included in the shunt circuit for main relay winding 261. In this manner, the energizations of the main relay windings 259 and 261 are again substantially equalized to move switch arm 255 back to its intermediate position between contacts 256 and 257.

On the other hand, a fall in temperature in any of the rooms or spaces causes opening of the associated damper and movement of one of the control arms 241, 242, 243 and 244 in clockwise direction so as to remove part of one of the control resistances 245, 246, 247 or 248 from the shunt circuit for main relay winding 259. The main relay winding 259 is thereupon less highly energized than main relay winding 261 and switch arm 255 engages contact 257 to cause rotation of main operating shaft 266 in opening direction. Balancing contact arm 291 therefore moves downwardly along balancing resistance 292 or in a clockwise direction to reestablish a substantially balanced condition in the energizations in main relay windings 259 and 261.

In this manner, any change in temperature in any of the rooms or spaces results in a corresponding shifting of the main damper 271 as well as a repositioning of the branch duct damper associated with such room or space.

From the foregoing, it will now be apparent that I have provided a novel system of air distribution having particular utility for air conditioning purposes wherein the volume of air supplied to a plurality of spaces or zones is varied or changed by the movements of the apparatus controlling the flow of air to the individual spaces or zones whereby the use of an apparatus responsive to the static pressure is obviated. While the systems of the present invention have been shown as applied to zone control systems wherein the supply of air to each zone is modulated or proportioned, it will be apparent that the underlying features of control disclosed herein are equally well applicable to zone control systems wherein the dampers controlling the flow of air to each particular room or zone are of the two-position type. It will further be apparent that many changes may be made in the details disclosed herein without departing from the spirit of the invention and I am therefore to be limited only by the scope of the appended claims:

I claim as my invention:

1. In an air conditioning system for a plurality of zones, in combination, an air distributing system for distributing air to said zones, means associated with said distributing system for forcing a circulation of air therethrough, flow varying means for selectively varying the flow of air from said distributing system into various of said zones, controlling means for controlling the total volume of air forced through said distributing system, control devices actuated with said flow varying means, and means controlled by the joint action of said control devices for controlling said total volume controlling means.

2. A system for distributing air to a plurality of spaces, comprising, in combination, means for conveying air to all of said spaces, power operated means for causing flow of air through said conveying means, individual damper means in control of the flow of air to each space, means to position each of said damper means, and means controlled by the average position of all of said damper means to reduce the total volume of air supplied to all of said spaces to a predetermined amount when the average position of all of said damper means is at a predetermined point.

3. In an air conditioning system for a plurality of zones, in combination, an air distributing system for distributing air to said zones, means associated with said distributing system for forcing a circulation of air therethrough, means for varying the total volume of air forced through said distributing system, control means for controlling the flow of air from said distributing system into respective zones, and means responsive to the average condition of the air in said zones for controlling said total volume varying means.

4. In an air conditioning system for a plurality of zones, in combination, an air distributing system for distributing air to said zones, means associated with said distributing system for forcing a circulation of air therethrough, flow varying means for varying the flow of air from said distributing system into various of said zones, means responsive to temperature for controlling said flow varying means in a manner to supply air to said zones in accordance with individual requirements, means for varying the total volume of air forced through said distributing system, a plurality of devices collectively influenced by the demand for air of all of the zones, and means controlled conjointly by said devices for controlling said total volume varying means.

5. In an air conditioning system for a plurality of zones, in combination, a conditioning chamber, duct means connecting said conditioning chamber to said zones, means for forcibly circulating air from said conditioning chamber to said zones, a condition changer for changing the condition of the air as it flows through said chamber, a controller for varying the total volume of air supplied to said zones, means for individually controlling the flow of conditioned air into respective zones, control devices actuated with said individual flow controlling means, and means controlled by the joint action of said control devices for controlling said total volume controller and said condition changer.

6. In an air conditioning system for a plurality of zones, in combination, a conditioning chamber, duct means connecting said conditioning chamber to said zones, means for causing flow of air from said conditioning chamber to said zones, a condition changer for changing the condition of the air as it flows through said chamber, a controller for varying the total volume of air supplied to said zones, individual flow controlling means for controlling the flow of conditioned air into respective zones, means responsive to the condition of the air in each zone for controlling the respective individual flow controlling means, and means responsive to the average condition of the air in said zones for controlling said condition changer and said total volume controller.

7. In an air conditioning system for a plurality of zones, in combination, a conditioning chamber, duct means connecting said conditioning chamber to said zones, means for forcibly circulating air from said conditioning chamber to said zones, a condition changer for changing the condition of the air as its flows through said chamber, a controller for varying the total volume of air supplied to said zones, means for individually controlling the flow of conditioned air into respective zones, and thermostatic means responsive to the total amount of conditioning required for all of the zones for controlling said condition changer and said total volume controller.

8. A fluid circulation system for a plurality of zones comprising in combination, conduit means associated with said zones, power operated means for causing a forced circulation of fluid through said conduit means, flow varying means for varying the flow of fluid between said conduit means and each of said zones, control devices actuated with said flow varying means, a controller for varying the total volume of fluid flowing in said conduit means, and means controlled by the joint action of said control devices for actuating said total volume controller.

9. A fluid circulation system for a plurality of zones comprising in combination, conduit means associated with said zones, power operated means for causing a forced circulation of fluid through said conduit means, means for varying the flow of fluid between said conduit means and each of said zones, a controller for varying the total volume of fluid flowing in said conduit means, a plurality of control devices collectively influenced by the total volume of fluid required by all of said zones, and means connected to and controlled by the conjoint action of said control devices for controlling said total volume controller.

10. A fluid circulation system for a plurality of zones comprising in combination, conduit means associated with said zones, power operated means for causing forced circulation of fluid through said conduit means, flow varying means for varying the flow of fluid between said conduit means and each of said zones, a controller for varying the total volume of fluid flowing in said conduit means, and means responsive to a condition at each of the zones cooperating to control said total volume controller in accordance with the total demand for fluid of all of the zones.

11. In an air distributing system, in combination, duct means to deliver air to a plurality of zones, damper means for controlling the flow of air from said duct means into each of said zones, condition responsive means for controlling said damper means and arranged to graduatingly position said damper means in accordance with the demand for air of the various zones, graduating control devices actuated with said damper means, means for controlling the total volume of air delivered to said spaces, and means graduatingly actuated by the joint action of said control devices for controlling said total volume controlling means.

12. In an air conditioning system in combination, duct means to deliver air to a plurality of zones, damper means for controlling the flow of air from said duct means into each of said zones, condition responsive means for controlling said damper means and arranged to graduatingly position said damper means in accordance with the demand for air of the various zones, graduating control devices actuated with said damper means, means for changing the condition of the air delivered to said zones by said duct means, and means graduatingly actuated by the joint action of said control devices for controlling said condition changing means.

13. In a system for distributing air to a plurality of spaces, in combination, means to deliver air to all of said spaces, means in control of the volume of air delivered to each space, a current controlling means associated with each space, a device in control of the air volume control means and current controlling means for each space, and means in control of the total volume of air supplied to all of the spaces controlled by the combined action of all of said current controlling means for varying the total volume of air supplied to all of the spaces in accordance with the sum of the volumes called for by the individual volume control means.

14. In an air conditioning system for a plurality of spaces, in combination, means to supply air to all of said spaces, separate dampers in control of the flow of air to each space, a variable resistance means associated with each space, a separate motor means in control of each damper means and associated variable resistance means, a separate controller responsive to a condition of the air in each space in control of the associated motor means, electromagnetic means controlled by the cooperative action of all of said resistance means, switching mechanism controlled by said electromagnetic means, and means in control of the total volume of air delivered to all of said spaces controlled by said switching mechanism.

15. In an air distribution system, in combination, means to deliver air to a plurality of spaces, a separate damper in control of the flow of air to each space, a separate control device in control of each damper, a current varying means controlled by each control device, a pair of oppositely acting electrical devices, a single member controlled thereby, electrical connections between said electrical devices and current varying means by which the relative energization of the former is controlled by the latter, and means in control of the total volume of air supplied to all of said spaces controlled by said single member.

16. In an air distribution system, in combination, means to deliver air to a plurality of spaces, a damper means to control the flow of air to each space, a motor means in control of each damper means, a controller responsive to a condition of the air in each space to graduatingly position its associated motor means in accordance with the condition in the space so as to position the damper means to supply the correct amount of air thereto, and means controlled by the conjoint action of all of said motor means in control of the total volume of air delivered to all of said spaces.

17. In an averaging control system, in combination, means to be controlled, switching means in control thereof, a pair of oppositely acting control devices conjointly controlling the operation of said switching means, said devices being connected in series across a source of power, a plurality of variable resistance controllers connected in parallel with only one of said devices, and variable resistance means actuated by said means to be controlled connected in parallel with only said other device.

18. In an averaging control system, in combination, means to be controlled, switching means in control thereof, a pair of oppositely acting control devices conjointly controlling the operation of said switching means, said devices being connected in series across a source of power, a plurality of variable resistance controllers connected in parallel with only one of said devices, resistance means connected in parallel with the other of said devices, and variable potentiometer means actuated by said means to be controlled, said potentiometer means including a slider connected to the adjacent portions of said series connected devices and a resistance connected to the remote end of said devices.

19. In a system for controlling the flow of a conditioning fluid through a plurality of paths, a separate flow controlling device for controlling the flow through each path, an electric motor means for each of said flow controlling devices for controlling the positions thereof, condition responsive means for controlling the various motor means, a circuit controlling means operated by each of said motor means, variable capacity circulating means for circulating fluid through all of said paths, and means operated by the combined action of all of said circuit controlling means for varying the capacity of said circulating means in accordance with the combined positions of the separate flow controlling devices.

20. In an averaging control system, in combination, a device to be controlled, switching means in control thereof, a pair of oppositely acting electrical devices conjointly controlling the operation of said switching means, said devices being connected in series across a source of power, a plurality of temperature operated series connected variable resistances connected in parallel with one of said devices and arranged to decrease the resistance in such parallel circuit upon temperature rise, a plurality of temperature operated series connected variable resistances connected in parallel with the other of said devices and arranged to increase the resistance in such parallel circuit upon temperature rise, and means responsive to operation of said device due to operation of said switching means to neutralize the unbalancing effect of said resistances on said oppositely acting electrical devices after said device has been adjusted an amount corresponding to the temperature change which caused operation of said switching means.

21. In a system of the class described, in combination, means to be controlled, switching means in control thereof, a pair of oppositely acting control devices conjointly controlling the operation of said switching means, said devices being connected in series across a source of power, fixed resistance means connected in parallel with one of said devices, variable control resistance means connected in parallel with the other of said devices only, and a variable balancing resistance actuated by the means to be controlled and connected in parallel with one of said devices only.

22. In an air conditioning system, in combination, an air conditioning chamber, duct means connecting said chamber with a plurality of zones to be conditioned, air conditioning means in said air conditioning chamber, fan means for circulating air through said chamber, duct means, and the zones to be conditioned, adjustable damper means associated with each zone for controlling the flow of air from said duct means into the various zones to be conditioned and as an incident to adjustment thereof varying the static pressure and velocity of the air being circulated by the fan means, means for varying the volume of air being circulated by the fan means in response to adjustment of the damper means in a manner to maintain the static pressure of the air on the discharge side of the fan within certain limits, and means for varying the effectiveness of the air conditioning means upon adjustment of the volume of air being circulated by said fan means.

23. In an air conditioning system, in combination, an air conditioning chamber, duct means connecting said chamber with a plurality of zones to be conditioned, temperature changing means in said air conditioning chamber, fan means for circulating air through said chamber, duct means and the zones to be conditioned at varying rates of flow, adjustable damper means associated with each zone for controlling the flow of air from said duct means into the various zones to be conditioned and as an incident to adjustment thereof varying the static pressure and velocity of the air being circulated by the fan means, means for varying the volume of air being circulated by the fan means in a manner to maintain the velocity and static pressure of the air being circulated by the fan within certain limits, and means responsive to the temperature changing load on the system for varying the temperature changing capacity of the temperature changing means.

24. In an air conditioning system, in combination, an air conditioning chamber, duct means connecting said chamber with a plurality of zones to be conditioned, cooling means in said air conditioning chamber, fan means for circulating air through said chamber, duct means and the zones to be conditioned, damper means associated with each zone controlling the flow of air from said duct means into the various zones to be conditioned, means for controlling the volume of air circulated by said fan in accordance with the positions of said damper means, in a manner to maintain the static pressure and velocity of the air within certain limits, and means for varying the capacity of the cooling means to reduce the cooling capacity thereof when the volume of air circulated by said fan is reduced to a predetermined value.

JAMES S. LOCKE.